US011068844B2

(12) United States Patent
Smith et al.

(10) Patent No.: US 11,068,844 B2
(45) Date of Patent: Jul. 20, 2021

(54) INVENTORY MANAGEMENT SYSTEM WITH STATISTICAL LEARNING

(71) Applicant: DeRoyal Industries, Inc., Powell, TN (US)

(72) Inventors: Joe L. Smith, Powell, TN (US); Mark McKnight, Knoxville, TN (US)

(73) Assignee: DeRoyal Industries, Inc., Powell, TN (US)

( * ) Notice: Subject to any disclaimer, the term of this patent is extended or adjusted under 35 U.S.C. 154(b) by 28 days.

(21) Appl. No.: 16/386,587

(22) Filed: Apr. 17, 2019

(65) Prior Publication Data

US 2019/0318303 A1  Oct. 17, 2019

Related U.S. Application Data

(60) Provisional application No. 62/658,747, filed on Apr. 17, 2018.

(51) Int. Cl.
| | |
|---|---|
| *G06Q 10/08* | (2012.01) |
| *G06N 20/00* | (2019.01) |
| *G06N 7/00* | (2006.01) |
| *G06K 7/10* | (2006.01) |

(52) U.S. Cl.
CPC ....... *G06Q 10/087* (2013.01); *G06K 7/10009* (2013.01); *G06N 7/005* (2013.01); *G06N 20/00* (2019.01)

(58) Field of Classification Search
CPC ........ G06Q 10/08; G06Q 50/10; G06Q 10/10; G06F 19/00; G06K 17/00; G06K 7/00; G06K 7/08

USPC ........ 705/22, 3, 2, 28; 340/10.3, 572.8, 5.92
See application file for complete search history.

(56) References Cited

U.S. PATENT DOCUMENTS

| | | | |
|---|---|---|---|
| 8,818,824 B2* | 8/2014 | DeBusk | G16H 20/13 705/3 |
| 9,922,304 B2* | 3/2018 | DeBusk | B65F 1/1426 |
| 9,990,466 B2* | 6/2018 | DeBusk | G06Q 10/10 |
| 10,152,688 B2* | 12/2018 | DeBusk | G06K 7/10316 |

(Continued)

OTHER PUBLICATIONS

Blaine R. Copenheaver, Notice of Transmittal of the International Search Report and the Written Opinion, dated Jul. 8, 2019; PCT/US2019/027832, Commissioner for Patents, Mail Stop PCT, Alexandria, VA.

(Continued)

*Primary Examiner* — Olusegun Goyea
(74) *Attorney, Agent, or Firm* — Luedeka Neely Group, PC

(57) ABSTRACT

Response parameters for a population of RFID tags present in an inventory space are determined by (a) continuously scanning the inventory space to interrogate the population of RFID tags and receiving responses from RFID tags within the population; (b) after multiple responses have been received from a specific RFID tag, determining response times for the specific RFID tag corresponding to time periods between sequential ones of the multiple responses from the specific RFID tag, (c) calculating a maximum acceptable response time based at least in part on the response times determined in step (b); and (c) recording a response interval data set including one or more of the response times determined in step (b) and the maximum acceptable response time calculated in step (c).

11 Claims, 6 Drawing Sheets

(56) References Cited

U.S. PATENT DOCUMENTS

| | | | |
|---|---|---|---|
| 2003/0001726 A1* | 1/2003 | Moore | G06K 17/00 340/10.3 |
| 2003/0216969 A1* | 11/2003 | Bauer | H01Q 7/00 705/22 |
| 2006/0061474 A1 | 3/2006 | Shanks et al. | |
| 2007/0023512 A1* | 2/2007 | Miller | G06Q 10/087 235/385 |
| 2012/0316987 A1 | 12/2012 | DeBusk et al. | |
| 2012/0317001 A1 | 12/2012 | DeBusk et al. | |
| 2014/0240088 A1* | 8/2014 | Robinette | G08B 13/1427 340/5.61 |
| 2014/0337040 A1 | 11/2014 | DeBusk et al. | |
| 2015/0102102 A1* | 4/2015 | Heim | G06Q 10/087 235/382 |
| 2015/0141066 A1* | 5/2015 | Ramanujam | H04L 51/12 455/466 |
| 2016/0110780 A1 | 4/2016 | DeBusk et al. | |
| 2017/0235896 A1 | 8/2017 | DeBusk et al. | |
| 2017/0249588 A1* | 8/2017 | Belstner | G06K 7/10128 |
| 2018/0096292 A1 | 4/2018 | DeBusk et al. | |

OTHER PUBLICATIONS

Ahmed Gamaleldin, RFID in Retail Stores and B2B Supply Chains, A Master's Thesis, Mar. 16, 2009, Long Island University, Brooklyn Campus, USA.

* cited by examiner

Number of RFID tags in the Population (n)

Number of RFID tags in the Population (n)

INVENTORY MANAGEMENT SYSTEM WITH STATISTICAL LEARNING

RELATED APPLICATIONS

This application claims priority to U.S. provisional patent application Ser. No. 62/658,747 filed Apr. 17, 2018 titled "Inventory Management System with Statistical Learning", the entire contents of which are incorporated herein by reference.

FIELD

This invention relates to the field of inventory management. More particularly, this invention relates to a system for determining response parameters for inventory management of a population of radio frequency identification (RFID) tags in an inventory space.

BACKGROUND

Unless otherwise indicated herein, the materials described in this section are not prior art to the claims in this application and are not admitted to be prior art by inclusion in this section.

Recently, RFID tags have emerged as a powerful tool in the realm of inventory management. RFID systems may be used to identify and locate items within an inventory. Traditionally, when scanning a group of RFID tags, an RFID reader may wait an arbitrary amount of time for the RFID tags to respond. If a response is received from an RFID tag, a corresponding object would be recorded as present, and if a response was not received the object would be recorded as absent.

Traditional practices may contribute to a slew of undesirable consequences. First, as the size of the population of RFID tags increases, response times may proportionally and even exponentially increase. In turn, RFID readers may wait exorbitant lengths of time for responses, which lends to proportionately more inefficient scans as the size of the group grows. Secondly, as RFID group size increases, the likelihood that an RFID tag may be incorrectly recorded as removed from the group of RFID tags also increases. For example, on its own an RFID tag may respond fairly quickly, in one second for example. However, when the RFID tag is included in a group of RFID tags, the RFID tag may take substantially longer to respond and may even respond after the RFID reader has concluded a scan. Consequentially, the RFID tag may be incorrectly recorded as removed. Thus, as group size increases, it could also be said that the accuracy of the scans decreases.

What is needed, therefore, are methods and apparatuses for more efficiently and dynamically scanning large groups of RFID tags.

SUMMARY

The present disclosure is generally directed to techniques for determining response parameters for inventory management of a population of RFID tags present in an inventory space.

According to some embodiments, a method for determining response parameters for inventory management of a population of RFID tags present in an inventory space may include collecting response data associated with the population of RFID tags present in the inventory space. The response data may include a plurality of response times that are each associated with a corresponding RFID tag in the population of RFID tags. The method may also include calculating a maximum acceptable response time for one or more RFID tags in the population of RFID tags based on the response data and scanning the inventory space to prompt a response from the one or more RFID tags in the population of RFID tags present in the inventory space. The method may further include, when a response is not received from a specific RFID tag in the population of RFID tags prior to elapse of the maximum acceptable response time for the specific RFID tag, designating the specific RFID tag as not present in the inventory space.

According to some embodiments, the method may also include, when a response is received from the specific RFID tag prior to elapse of the maximum acceptable response time for the specific RFID tag, designating the specific RFID tag as present in the inventory space.

According to some embodiments, the method may include calculating response parameters based on response times associated with individual RFID tags in the response data set or based on response times associated with the population of RFID tags in the response data set.

According to some embodiments, the response parameters may include a mean response time and a standard deviation from the mean response time.

According to some embodiments the maximum acceptable response time may equal to one of the mean response time plus six standard deviations, the mean response time plus nine standard deviations, the mean response time plus twelve standard deviations, or a maximum response time.

According to some embodiments, the methods may include, when the response is received from the specific RFID tag prior to elapse of the maximum acceptable response time for the specific RFID tag recording a response time for the specific RFID tag, updating the response data set to include the response time for the specific RFID tag, and recalculating the response parameters for each RFID tag based on the updated response data set.

In another aspect, some embodiments provide an apparatus for monitoring a population of RFID tags in an inventory space. The apparatus may include one or more RFID antennae disposed within the inventory space that are configured to receive radio frequency (RF) signals emanated from the population of RFID tags located in the inventory space, and the RF signals may include identification information. The apparatus may also include one or more RFID readers associated with the inventory space, and the one or more RFID readers may be communicatively coupled to the one or more RFID antennae. The one or more RFID readers may be configured to decode the identification information contained with the RF signals emanated from the population of RFID tags in the inventory space. The apparatus may further include a controller communicatively coupled with the one or more RFID antennae and the one or more RFID readers. The controller may be configured to collect response data associated with the population of RFID tags present in the inventory space. The response data may include a plurality of response times that are each associated with a corresponding RFID tag in the population of RFID tags. The controller may also be configured to calculate a maximum acceptable response time for one or more RFID tags in the population of RFID tags based on the response data set. The controller is further configured to scan the inventory space to prompt a response from the one or more RFID tags in the population of RFID tags present in the inventory space. The controller may be further configured to designate a specific RFID tag as not present in the inventory space when a response is not received from the specific RFID tag in the population of RFID tags prior to elapse of the maximum acceptable response time for the specific RFID tag.

In some embodiments, the controller may be configured to designate the specific RFID tag as present in the inventory space when a response is received from the specific RFID tag prior to elapse of the maximum acceptable response time for the specific RFID tag.

In some embodiments, the controller may calculate the response parameters based on response times associated with individual RFID tags in the response data set or based on response times associated with the population of RFID tags in the response data set. The response parameters include a mean response time and a standard deviation from the mean response time.

In some embodiments the maximum acceptable response time may be equal to the mean response time plus six standard deviations, the mean response time plus nine standard deviations, the mean response time plus twelve standard deviations, or a maximum response time.

In some embodiments, when the response is received from the specific RFID tag prior to elapse of the maximum acceptable response time for the specific RFID tag, the controller may be configured to record a response time for the specific RFID tag, update the response data set to include the response time for the specific RFID tag, and recalculate the response parameters for each RFID tag based on the updated response data set.

In some embodiments, the apparatus may include an inventory database configured to store inventory information associated with the inventory space. The inventory database may be communicatively coupled with the controller.

In another aspect, embodiments of the invention provide a method for determining response parameters for a population of RFID tags present in an inventory space comprising. A preferred embodiment includes steps of:
 (a) continuously scanning the inventory space to interrogate the population of RFID tags in the inventory space and receiving responses from a plurality of RFID tags within the population of RFID tags;
 (b) after multiple responses have been received from a specific RFID tag within the population of RFID tags, determining response times for the specific RFID tag corresponding to time periods between sequential ones of the multiple responses from the specific RFID tag;
 (c) calculating a maximum acceptable response time based at least in part on the response times determined in step (b); and
 (d) recording a response interval data set including one or more of the response times determined in step (b) and the maximum acceptable response time calculated in step (c).

In some embodiments, the method includes, after step (c), designating the specific RFID tag as present in the inventory space if a subsequent response is received from the specific RFID tag prior to elapse of the maximum acceptable response time measured from a most recent previous response from the specific RFID tag.

In some embodiments, the method includes, after step (c), designating the specific RFID tag as not present in the inventory space if a subsequent response is not received from the specific RFID tag prior to elapse of the maximum acceptable response time measured from a most recent previous response from the specific RFID tag.

In some embodiments, step (c) further comprises calculating a mean response time and a standard deviation from the mean response time based on the response times determined in step (b).

In some embodiments, step (b) is performed continuously, and step (c) further comprises calculating a running mean response time and a running standard deviation based on the response times determined in step (b).

In some embodiments, the maximum acceptable response time is equal to the mean response time plus six standard deviations, the mean response time plus nine standard deviations, or the mean response time plus twelve standard deviations'

In some embodiments, the maximum acceptable response time is equal to a largest one of the response times determined in step (b).

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Other embodiments of the invention will become apparent by reference to the detailed description in conjunction with the figures, wherein elements are not to scale so as to more clearly show the details, and wherein like reference numbers indicate like elements throughout the several views, and wherein.

DETAILED DESCRIPTION

Figure 1:
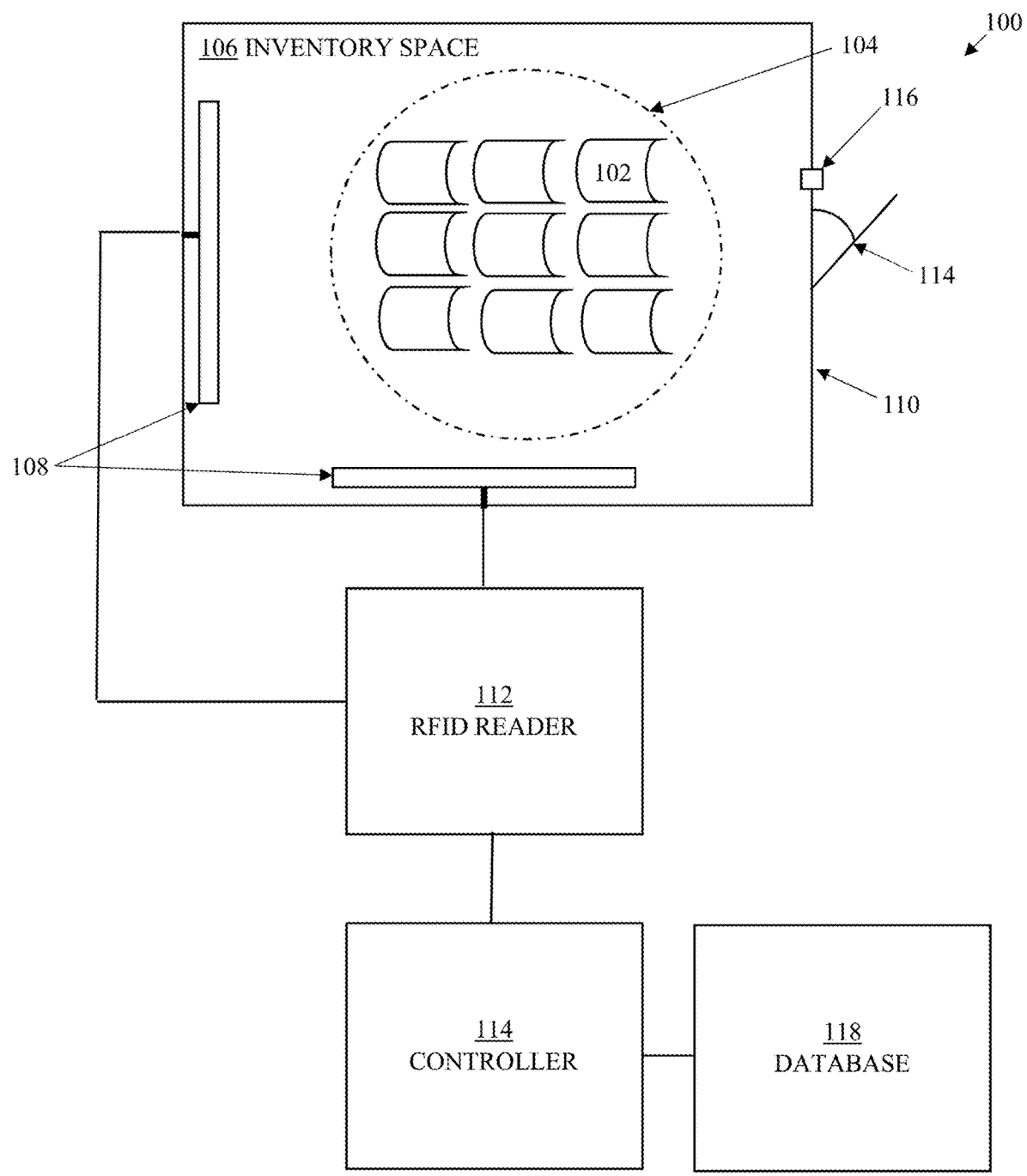
FIG. 1 depicts a conceptual diagram of an apparatus for determining response parameters for inventory management of a population of RFID tags in an inventory space according to a preferred embodiment.

In the following detailed description, reference is made to the accompanying drawings, which form a part hereof. The illustrative embodiments described in the detailed description, drawings, and claims are not meant to be limiting in scope. Other embodiments may be utilized, and other changes may be made without departing from the spirit or scope of the subject matter presented herein. This disclosure is generally drawn, inter alia, to methods, apparatuses, systems, and/or devices related to determining response parameters for inventory management of a population of RFID tags present in an inventory space.

According to some embodiments of the invention, an apparatus may be configured to modify response parameters for inventory management of a population of RFID tags present in an inventory space. The apparatus may include the inventory space. The inventory space may vary drastically in size and shape and should not be interpreted as a particular class of storage space. For example, in some embodiments the inventory space may be a container that is less than a cubic foot in volume and meant for transporting inventory items from one location to another. Conversely, in other embodiments, the inventory space may be a large warehouse covering many thousands of square feet and containing thousands of inventory items. In some embodiments, multiple inventory spaces may be disposed in a single room. For example, a storage closet or cabinet may contain a plurality of storage shelves, and each shelf may correspond with a separate inventory space.

Additionally, an inventory space may incorporate a plurality of components, such as a shielded enclosure, a door, and a door controller among other things. Generally, the shielded enclosure may be configured to attenuate RF signals emanated from RFID tags disposed outside the shielded enclosure to levels that are substantially undetectable within the internal space. Moreover, to compliment the functionality of the shielded enclosure, the door may also be shielded. While the term door is used throughout this application, it is not intended to be limited to the physical embodiments of a door. Instead, it should be interpreted as a means of accessing the inventory space. Returning to an example from the previous paragraph, the inventory space may be a container that is less than a cubic foot and include a sealed opening, which should be considered as analogous to the term 'door' as recited herein. Lastly, the door controller may take on a host of embodiments ranging from a simple switch or electrode to a device with multiple mechanical components to facilitate the operation of a large, heavy door. The door controller may be configured to determine if the door is open or closed as well as to control the opening and closing of the door.

According to some embodiments, the inventory space may be a secured, limited-access location, and the apparatus may further include an authentication mechanism that authorized personnel may use to gain access to the inventory space. The authentication mechanism may be a keypad, magnetic stripe reader (card swipe), proximity reader, RFID tag reader, biometric sensor device, a facial recognition device, or other entry-access device, among other things. In some embodiments, the authentication mechanism may be communicatively coupled with a controller or computer hardware device.

Generally stated, the apparatus includes an RFID system that includes one or more RFID antennae, one or more RFID readers, and the population of RFID tags in the inventory space. Any type of RFID system may be implemented in the practice of the disclosed invention. For example, the RFID system may be an active tag-active reader, active reader-passive tag, or passive reader-passive tag system. Additionally, the RFID system may be configured to operate at different frequency ranges, such as Low Frequency (LF), High Frequency (HF), or Ultra High Frequency (UHF) among other possibilities. The specific properties associated with the RFID system associated with the apparatus may vary situationally but should not be seen as limiting in regards to the scope of the present invention.

According to some embodiments, the apparatus may include one or more RFID antennae and one or more RFID readers, which are communicatively coupled. The one or more RFID antennae may be disposed within the inventory space and configured to receive RF signals emanated from a population of RFID tags within the inventory space. The one or more RFID readers may be configured to decode identification information contained within the received RF signals. The one or more RFID antennae and one or more RFID readers may be physically separate according to some embodiments and may be combined into a single physical component according to other embodiments of the disclosed invention.

According to some embodiments, the apparatus may include a computer hardware device. The computer hardware device may be a server, a desktop computer, a special purpose computing device, a tablet computer, a smart phone, or a component level processor. The computer hardware device includes, among other things, a memory configured to store instructions and one or more processors that are communicatively coupled with the memory.

The computer hardware device may also include a plethora of other components including, but not limited to, one or more data storage devices, which may be removable and non-removable, audio and video output components, peripheral components, and communication components. Audio and video output components include, but are not limited to, an audio processing unit and a graphics processing unit (GPU), which may be configured to communicate with various external devices, such as a display device or speakers via one or more A/V ports, or be configured to perform computations and generate relevant outputs. Peripheral components include, but are not limited to, input devices (e.g., keyboard, mouse, pen, voice input device, touch input device, etc.) and other peripheral devices (e.g. printer, scanner, etc.) which may communicate via a serial bus interface, such as a USB port, or parallel port interface. A communication component may include, among other things, a network controller configured to facilitate communications with one or more other computing devices over a network communication link via one or more communication ports, such as an ethernet port, or via a wireless network. The one or more other computing devices are not limited to devices that are on the same premises as the computer hardware device and may include computing devices such as servers at a remote datacenter.

Figure 2:
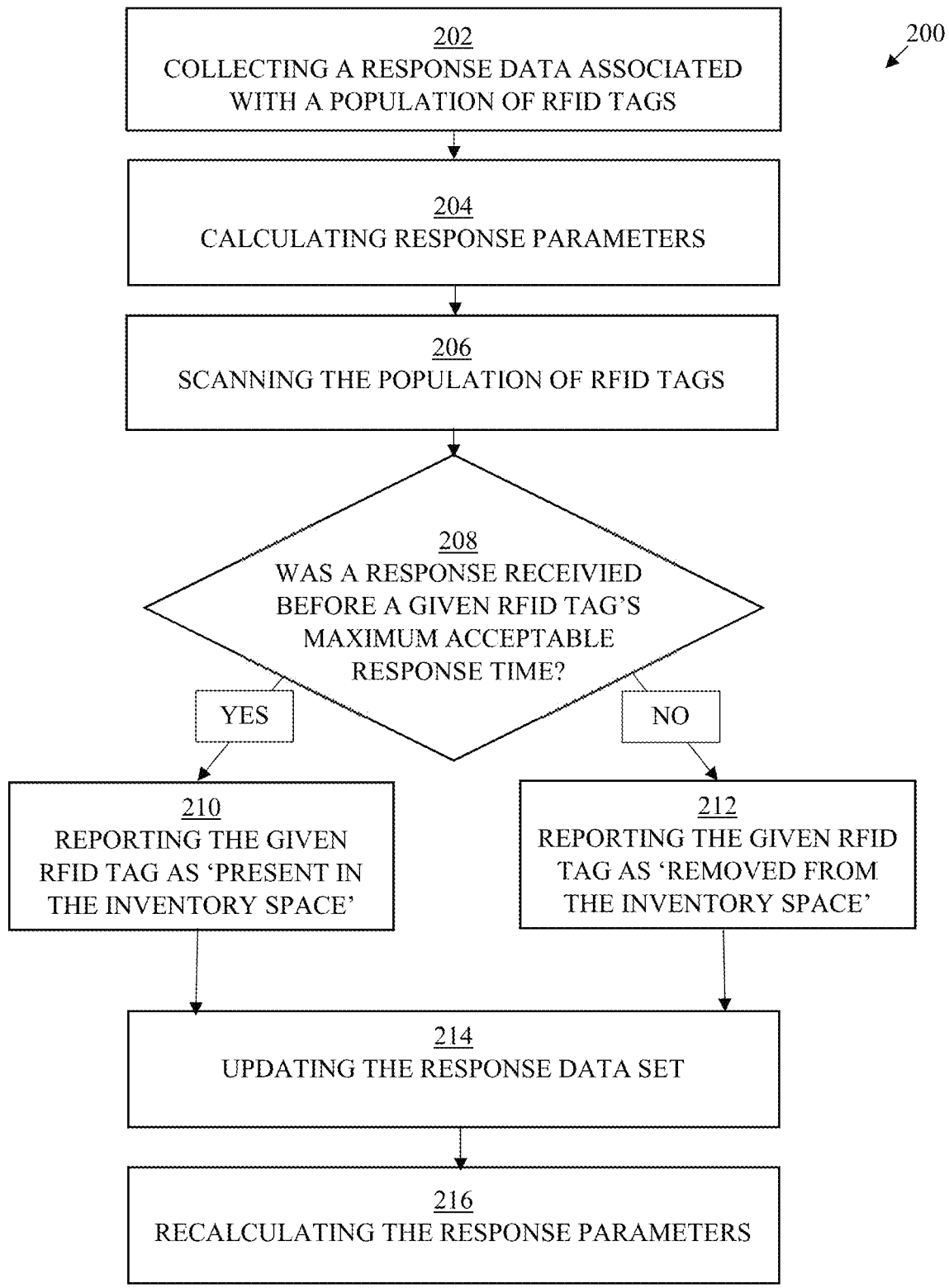
FIG. 2 depicts an exemplary method for determining response parameters for inventory management of a population of RFID tags in an inventory space that may be performed by an apparatus, such as the apparatus in FIG. 1.

FIG. 1 depicts a conceptual diagram of an apparatus 100 for determining response parameters for inventory management of a population of RFID tags present in an inventory space according to a first embodiment. In some embodiments, the apparatus 100 may include an inventory space 106, one or more RFID antennae 108 and 110, an RFID reader 112, a controller 114, and an inventory database 118. FIG. 2 depicts an embodiment of a method 200 for determining response parameters for inventory management of a population of RFID tags using the apparatus 100 of FIG. 1.

A specific RFID tag 102 may be a part of the population of RFID tags 104 stored within the inventory space 106. Additionally, the RFID tag 102 may be associated with an object (i.e. an inventory item). For example, the specific RFID tag 102 may be adhered to the object, embedded in the object, embedded in a container that stores the object, or embedded in the object's packaging, among other possibilities. The method of association between the object and the specific RFID tag 102 should not be seen as limiting, as any means of association may be employed in the practice of the disclosed invention.

According to some embodiments, the specific RFID tag 102 may be configured to store information associated with the attached object. Information associated with an attached object or inventory item may include one or more of the name of the object, the manufacturer of the object, the serial number of the object, the batch code of the object, the manufacture date of the object, a date the object was received, a date the object entered the inventory space, and an expiration date of the object, among other things. Generally, any information associated with the object that may be deemed pertinent to inventory management may be stored on the specific RFID tag 102. Alternatively, in some embodiments, the controller 114 may be configured to store the information associated with the object and associate the information with the specific RFID tag 102.

In some embodiments, the specific RFID tag 102 may be a part of the population of RFID tags 104 stored in the inventory space 106. As discussed above, the inventory space 106 may include a shielded enclosure 110, a door 114, and a door controller 116. Additionally, one or more RFID antennae 108 may be disposed within the inventory space and configured to receive RF signals emanated from the population of RFID tags 104. For example, in the apparatus 100, the first and second RFID antennas 108 are disposed within the inventory space 106 and configured to capture RF signals emanated from the population of RFID tags 104. The RF signals emanated from the population of RFID tags 104 may contain the information associated with the object attached to each RFID tag in the population of RFID tags 104, such as the specific RFID tag 102. The one or more RFID readers, in this case the RFID reader 112, may perform scans to detect RFID tags within the inventory space 106. The RFID reader 112 may be further configured to decode the information associated with the attached object contained within the received RF signals. In some embodiments, the RFID reader 112 may be controlled by the controller 114. For example, the controller 114 may instruct the RFID reader 112 to initiate and perform a scan with specific parameters.

According to at least some embodiments, the controller 114 may be a computer hardware device, such as a desktop computer, a laptop computer, a server, a special purpose computing device, a tablet computer, a smart phone, or a component level processor, among other things. The controller 114 may be configured to collect a response data set associated with the population of RFID tags 104 present in the inventory space 106. The response data set may include any values relevant to statistical analysis, such response times for each RFID tag in the population of RFID tags 104.

According to some embodiments, the inventory database 118 may be another computing device (e.g. an on-premises or remote server, a desktop computer, etc.), an external storage device (e.g. an external hard drive), or may correspond with a virtual storage device (i.e. a cloud database). The inventory database 118 may be configured to store inventory information associated with the inventory space 106. Inventory information may include, among other things, a status of each RFID tag in the inventory space 106 and information associated with the inventory items stored in the inventory space 106. The status of an RFID tag may indicate whether the RFID tag is present in the inventory space or removed from the inventory space. For example, the inventory database 118 may store a status of the specific RFID tag 102 as present in the inventory space 106 along with information associated with the inventory item 102.

The specific methods for scanning the inventory space 106 may depend on the type of RFID system employed, the characteristics of the inventory space 106, and the number of RFID antennae 108 disposed within the inventory space. In a preferred embodiment, the controller 114 instructs the RFID reader 112 to continuously scan the inventory space 106. As the term is used herein, "continuously scanning" refers to the RFID reader 112 continuously switching its connection from one to another of the RFID antennae 108 at periodic intervals, such as every 200 milliseconds, which causes the selected antenna 108 to send a burst of RF energy into the inventory space 106 to interrogate the population of RFID tags 104. For example, if there are four RFID antennae 108, the RFID reader 112 may cycle through the four antennae in 800 milliseconds, and then repeat continuously. In the preferred embodiment, the timing of the switching between antennae is programmable, and it may be independent at least in part on the response times of the RFID tags in the inventory space 106.

In a preferred embodiment, the RFID reader 112 continuously or periodically collects tag response data from individual RFID tags in the population of RFID tags 104 in the inventory space (step 202 in FIG. 2). This response data may include response times from specific RFID tags. As the term is used herein, "response times" for a specific RFID tag 102 in a population of RFID tags 104 are the periods of time between sequential responses from the specific RFID tag 102 as the RFID reader 112 continuously scans the inventory space 106. For example, after the RFID reader 112 begins a continuous scan of the inventory space 106 at a time $T_0$, the specific RFID tag 102 may provide a first response at a time $T_1$, a second response at a time $T_2$, a third response at a time $T_3$, and a fourth response at a time $T_4$. The response times in this example are $T_1-T_0$, $T_2-T_1$, $T_3-T_2$, and $T_4-T_3$. If $T_0=0$ seconds, $T_1=2.0$ seconds, $T_2=4.1$ seconds, $T_3=6.0$ seconds, and $T_4=8.4$ seconds, then the first response time ($RT_1$) is 2.0 seconds, the second response time ($RT_2$) is 2.1 seconds, the third response time ($RT_3$) is 1.9 seconds, and the fourth response time ($RT_4$) is 2.4 seconds. A "mean response time" based on these four response times is $$\frac{RT_1 + RT_2 + RT_3 + RT_4}{4} = \frac{2.0 + 2.1 + 1.9 + 2.4}{4} = \frac{8.4}{4} = 2.1 \text{ seconds.}$$

In an example scenario, the controller 114 instructs the RFID reader 112 to continuously scan the population of RFID tags 104 in order to collect a response data set. During the scan, the controller 114 records the response times for each RFID tag in the population 104.

The controller 114 may be further configured to calculate response parameters for each RFID tag in the population of RFID tags 104 based on the response data set (step 204). The response parameters for each RFID tag include, but are not limited to, the mean response time, a standard deviation from the mean response time, and a maximum acceptable response time. As discussed above, the controller 114 may calculate the mean response time for each RFID tag by averaging the response times in the response data set for each RFID tag. The controller 114 also preferably calculates the standard deviation from the mean response time for each RFID tag using the response times in the response data set and the calculated value for the mean response time for each RFID tag.

The controller 114 may also determine a maximum acceptable response time for each RFID tag. In some embodiments, the maximum acceptable response time is set equal to the mean response time plus six standard deviations. According to other embodiments, the maximum acceptable response time is set equal to the mean response time plus nine standard deviations, or the mean response time plus twelve standard deviations. In an alternative embodiment, the maximum acceptable response time is set equal to a maximum response time, which corresponds to the longest recorded response time for a particular RFID tag.

In some embodiments, the controller 114 may also be configured to calculate response parameters for the population of RFID tags 104 as a whole.

In preferred embodiments, as the RFID reader 112 continues to scan the inventory space 106 (step 206), responses from the population of RFID tags 104 are continously captured by the RFID antennae 108 and decoded by the RFID reader 112. In some instances, the controller 114 may receive, via the RFID reader 112, a response from the specific RFID tag 102 prior to the tag's maximum acceptable response time (step 208), in which case the controller 114 designates the specific RFID tag 102 as present in the inventory space (step 210). Alternatively, the specific RFID tag 102 may have been removed from the inventory space 106 prior to the scan. In such a scenario, the maximum acceptable response time for the specific RFID tag 102 may expire without a response from the specific RFID tag 102 having been received (step 208). In that case, the controller 114 desginates the specific RFID 102 as removed from the inventory space (step 212).

Additionally, according to some embodiments, when a response is received prior to the specific RFID tag's 102 maximum acceptable response time, the controller 114 may be configured to record a response time for the specific RFID tag 102. In at least some embodiments, each time a response is received from the specific RFID tag 102, the controller 114 may record the response time (step 214) and update the response data set to include the response time.

According to at least some embodiments, the controller 114 may update the response data set periodically. For example, the controller 114 may be configured to update the response data set every time the door 114 to the inventory space 106 is closed after having been open, or periodically, such as hourly or daily. Updating the response data set may include adding the response times for RFID tags that have been introduced to the inventory space 106 since the last time the response data set was updated.

In further embodiments, the controller 114 may be configured to recalculate the response parameters for each RFID tag and the response parameters for the population of RFID tags 104 based on the updated data set (step 216). In doing so, the controller 114 may recalculate the mean response time and the standard deviation from the mean response time for specific RFID tags based on newly recorded response times. This may be accomplished by implementing a running mean and standard deviation calculation as described herein. The controller 114 may subsequently recalculate the maximum acceptable response time based on the updated values for the mean response time and the standard deviation for the specific RFID tags.

In some cases, the controller 114 may receive a response from a specific RFID tag 102 after the specific RFID tag's maximum acceptable response time has elapsed. In this case, the controller 114 designates the specified RFID tag 102 as present in the inventory space.

In some scenarios, the processor may receive a response from a specific RFID tag 102 for which no maximum acceptable response time is locally available at the controller 114 (i.e. the value for the maximum acceptable response time is unknown). This may occur when a tagged inventory item is first placed in the inventory space 106 during a time when the RFID reader 112 is not actively scanning, such as when the door is open and/or personnel are within the inventory space 106. When the controller 114 receives a response from a specific RFID tag 102 for which the maximum acceptable response time is unknown, the controller 114 may be configured to retrieve response parameters for the specific RFID tag 102 and information associated with the inventory item to which the tag is attached from the inventory database 118, if such data is available. The controller 114 may also be configured to designate the specific RFID tag 102 as present in the inventory space.

According to some embodiments, the controller 114 may be further configured to recalculate the response parameters for individual RFID tags and for the entire population of RFID tags 104. The controller 114 may be further configured to transmit the status of each RFID tag in the population of RFID tags 104 (e.g. the status of the specific RFID tag 102), information associated with the inventory item attached to each RFID tag, the response data set, the response parameters for each RFID tag, and the response parameters for the population of RFID tags 104, among other things, to the inventory database 118. In some embodiments, the inventory database 118 may be configured to update the inventory information based on the transmitted data.

Figure 3:
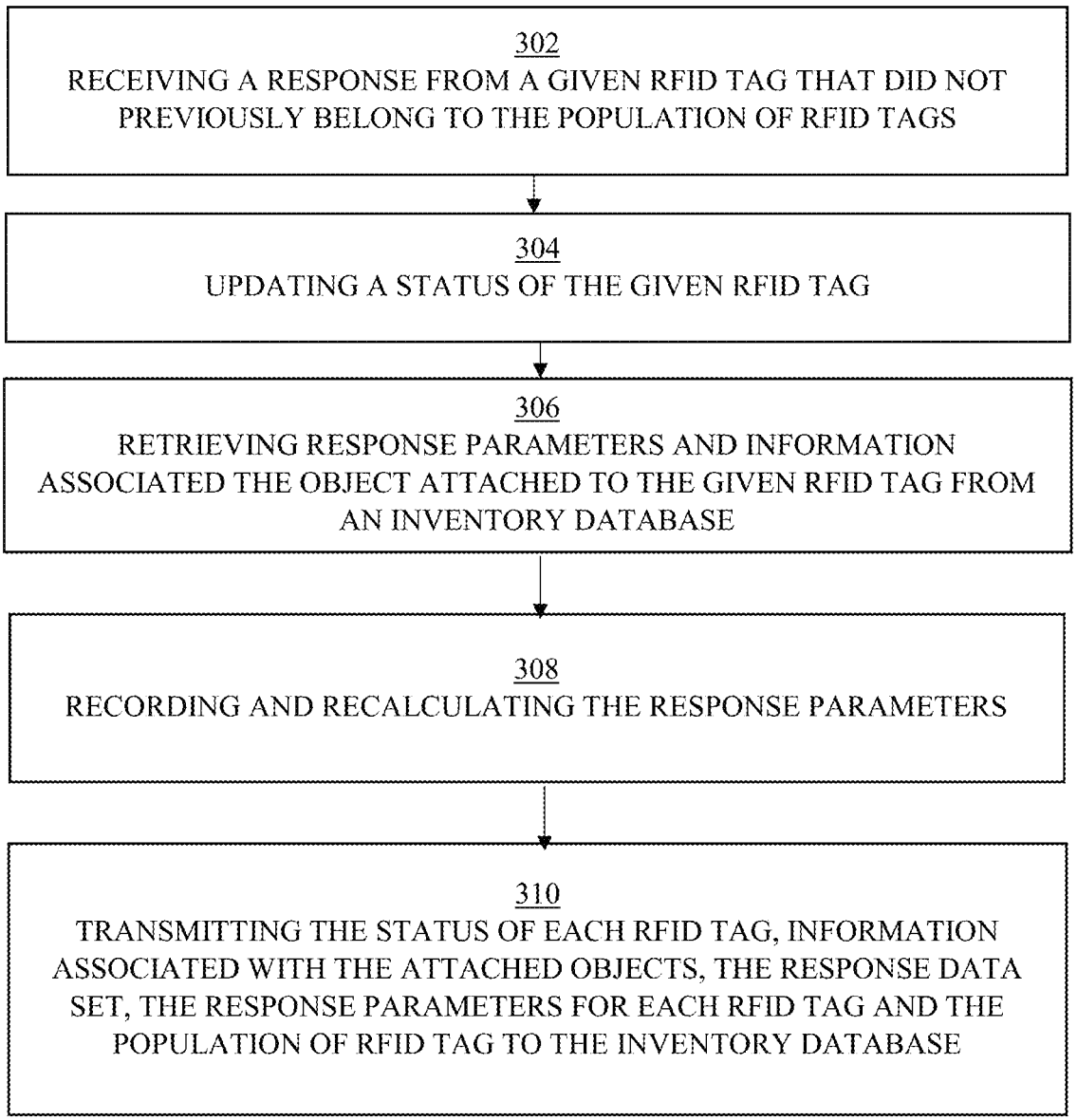
FIG. 3 illustrates further steps that may be included in the method depicted in FIG. 3.

FIG. 3 illustrates additional steps 300 that may be included in the method depicted in FIG. 2 according to at least some embodiments described herein. The additional steps 300 may include, during a scan of the inventory space, receiving a response from a specific RFID tag that did not previously belong to the population of RFID tags (step 302) (i.e. the inventory item corresponding to the specific RFID tag may have been added to the inventory space after the most recent scan). For example, a controller, configured to execute the elements of the method, may instruct one or more RFID readers to perform a scan of the inventory space. During the scan, the controller may receive a response from the specific RFID tag and determine that the specific RFID tag is not currently associated with (i.e. belong to) the population of RFID tags 104.

The method may continue by updating the status of the specific RFID tag (step 304). The status of the specific RFID tag may indicate that the specific RFID tag is either present in the inventory space or removed from the inventory space. According to some embodiments, the status of the specific RFID tag may further identify which inventory space or population of RFID tags the specific RFID tag belongs to. Returning to the example above, the controller may update the status of the specific RFID tag to present in the inventory space and may also distinguish the inventory space from any other (i.e. identify the inventory space in which the specific RFID is present).

The method may proceed by querying the inventory database to retrieve the response parameters for the specific RFID tag and information associated with the inventory item attached to the RFID tag (step 306). Returning again to the example above, the controller may query the inventory database to retrieve the response parameters associated with the specific RFID tag and information associated with the inventory item attached to the specific RFID tag. The response parameters may include the mean response time, the standard deviation from the mean response time, the maximum acceptable response time, or previous response times for the specific RFID tag, among other things. Information associated with the inventory item may include a name of the object, the manufacturer of the object, the serial number of the object, the batch code of the object, the manufacture date of the object, a date the object was received, a date the object entered the inventory space, or an expiration date of the object among other things. specific The method may continue by recording a response time for the specific RFID tag and updating the response data set to include the response time for the specific RFID tag (step 308). Additionally, the response data set may be updated based on the response parameters and information retrieved from the inventory database. For example, the response data set may be updated to include the specific RFID tag's previous response times that were stored at the inventory database. The step 308 may also include recalculating the response parameters for each RFID tag in the population of RFID tags and the response parameters for the entire population of RFID tags based on the updated response data set.

The method may conclude by transmitting the listed data to the inventory database and updating the inventory information stored at the inventory database based on the transmitted data (step 310).

Figure 4:
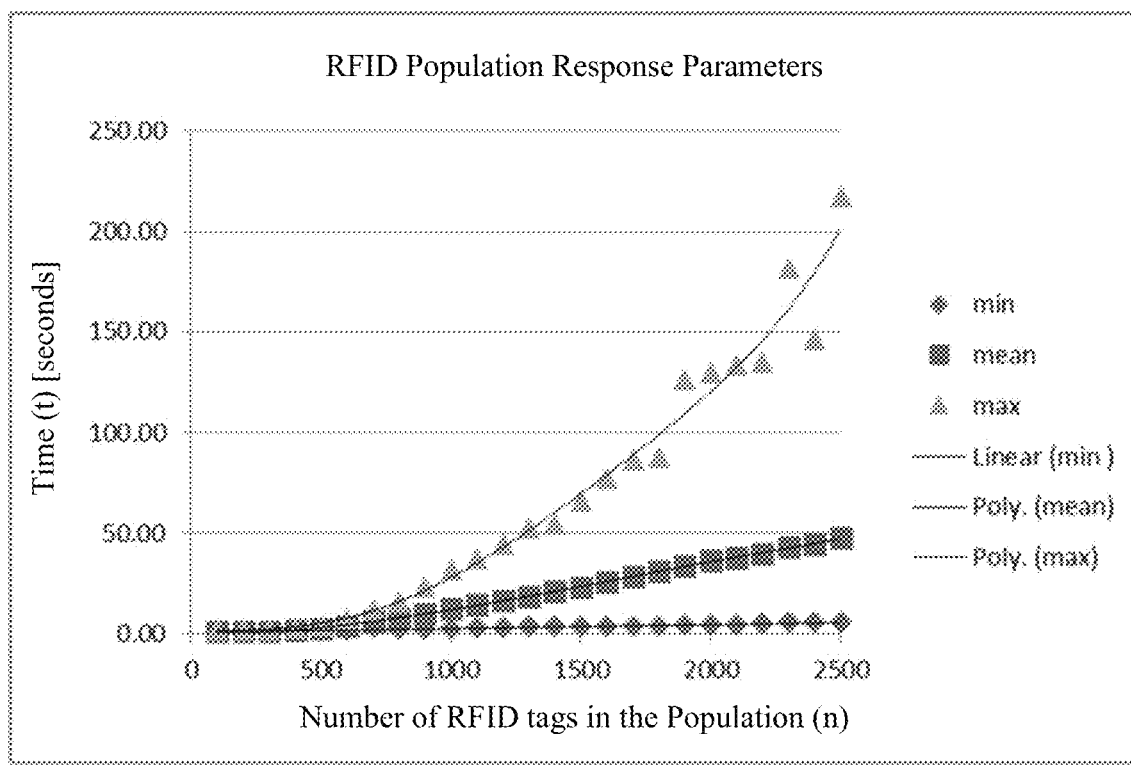
FIG. 4 illustrates an exemplary plot of response times associated with a population of RFID tags present in an inventory space.

As discussed above, response parameters may be calculated for each RFID tag in a population of RFID tags and for the entire population of RFID tags. The plot depicted in FIG. 4 illustrates changes in mean maximum acceptable response time (squares), highest maximum acceptable response time (triangles), and lowest maximum acceptable response time (diamonds) as the number (n) of RFID tags in a population of RFID tags increases. The mean maximum acceptable response time (squares) represents an average of the maximum acceptable response times for the RFID tags present in the population. The highest maximum acceptable response time (triangles) corresponds to the RFID tag present in the population with the highest maximum acceptable response time. This RFID tag is typically the slowest to respond or least predictable tag in the population. The lowest maximum acceptable response time (diamonds) corresponds to the RFID tag present in the population having the lowest maximum acceptable response time. This RFID tag is typically the fastest or most predictable tag in the population. As shown in the plot in FIG. 4, the highest maximum acceptable response time (triangles) generally increases in a non-linear fashion as the number of tags in the population increases.

Figure 5A:
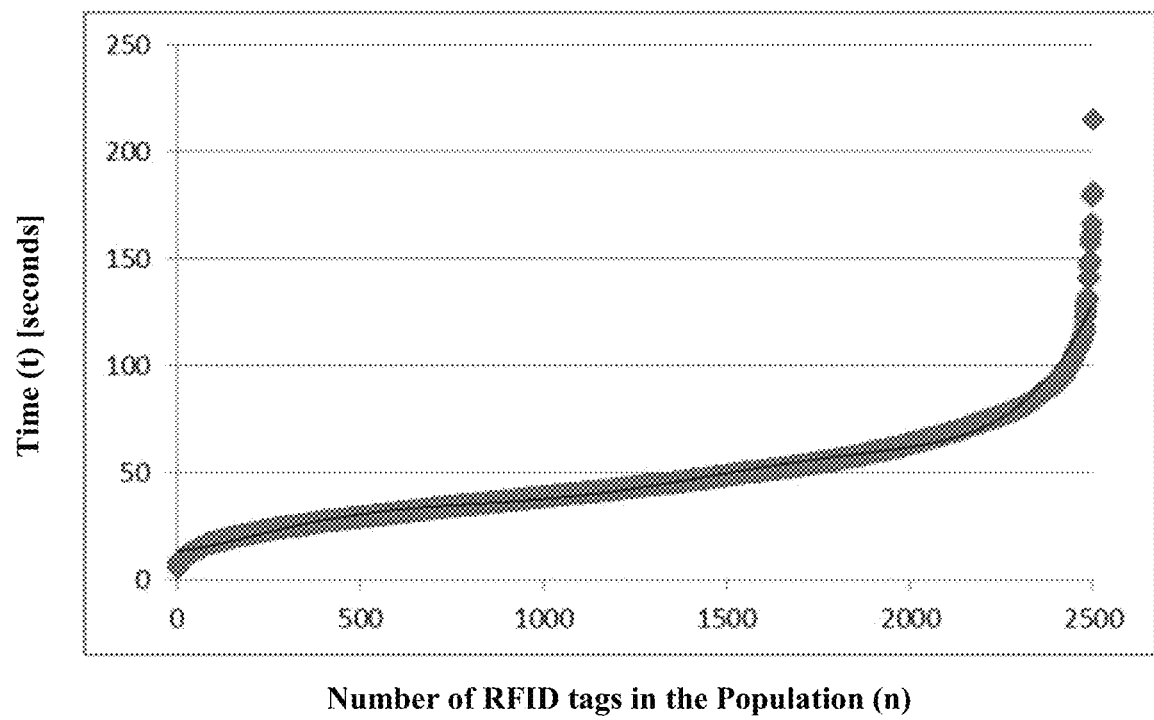
FIG. 5A-5C depict plots of response times for three different populations of RFID tags that include 2500 RFID tags (FIG. 5A), 2000 RFID tags (FIG. 5B), and 1000 RFID tags (FIG. 5C).
Figure 5B:
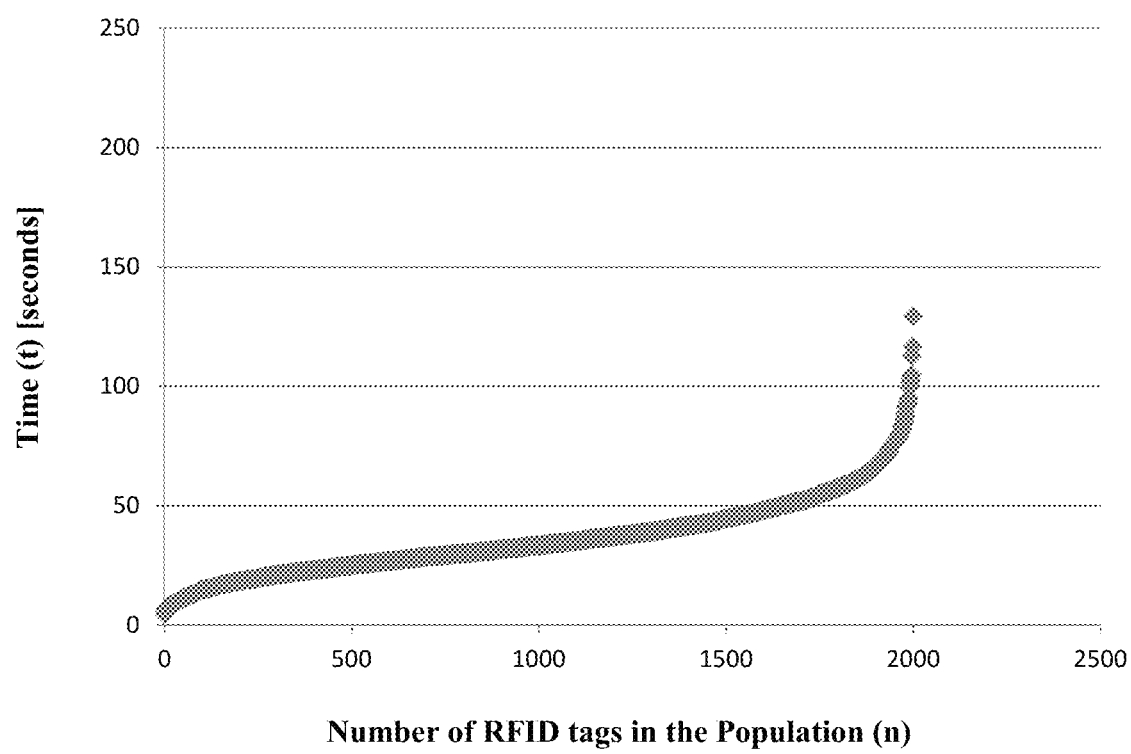
Figure 5C:
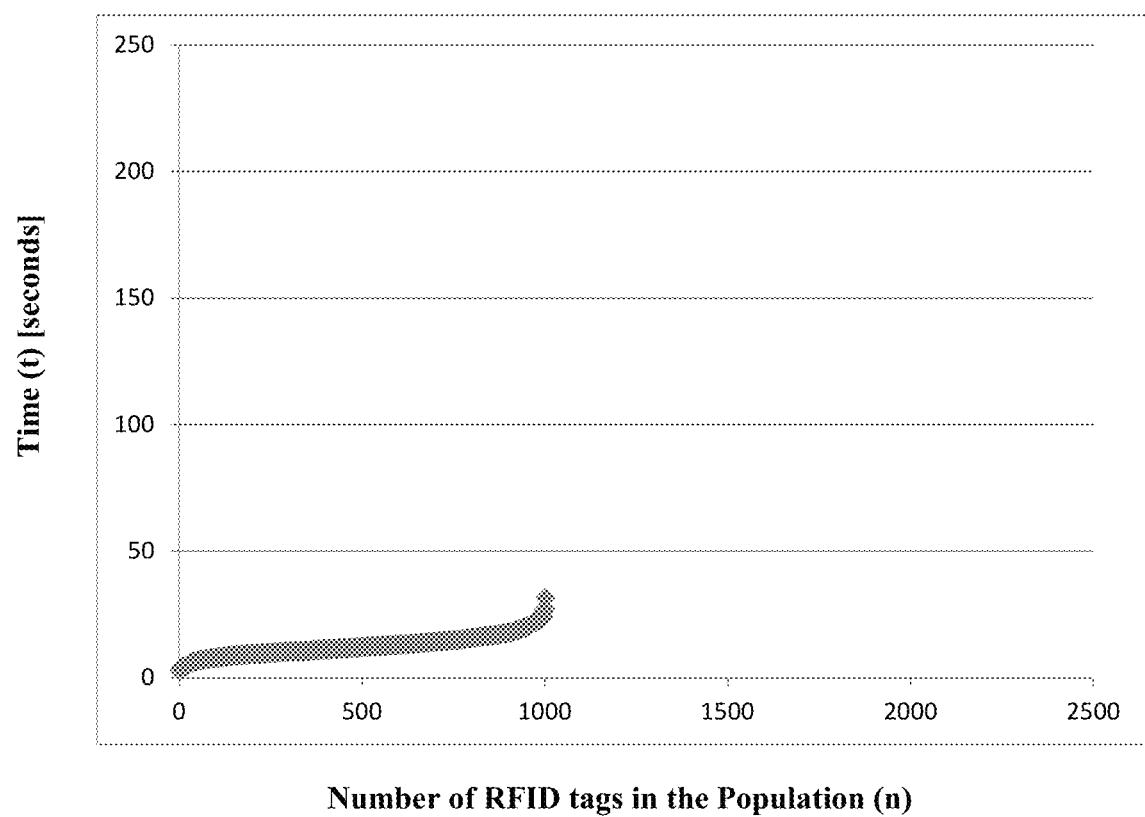

FIG. 5A depicts a plot of maximum acceptable response times for a population of 2500 RFID tags, FIG. 5B depicts a plot of the maximum acceptable response times for a population of 2000 RFID tags, and FIG. 5C depicts a plot of the maximum acceptable response times for a population of 1000 RFID tags.

The populations of RFID tags depicted in FIGS. 5A, 5B, and 5C each represent exemplary embodiments in which the maximum acceptable response time is set equal to the mean response time plus six standard deviations from the mean response time. Within the population of 2500 RFID tags depicted in FIG. 5A, the lowest maximum acceptable response time is 5.980 seconds, and the highest maximum acceptable response time is 215.331 seconds. As shown in FIG. 5B, the lowest maximum acceptable response time for an RFID tag present in the population of 2000 tags is 4.286 seconds, and the highest maximum acceptable response time is 129.492 seconds. As shown in FIG. 5C, the lowest maximum acceptable response time for an RFID tag present in the population of 1000 tags is 2.826 seconds, and the highest maximum acceptable response time is 31.451 seconds. It has been determined that most of the time, RFID tags present in a population of RFID tags will respond well prior to the elapse of their calculated maximum acceptable response time. For example, an RFID tag within the population of 1000 RFID tags may have a maximum acceptable response time of 31.451 seconds but will typically report in less than five seconds.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for determining response parameters for inventory management of a population of RFID tags present in an inventory space comprising:
    (a) collecting response data associated with the population of RFID tags present in the inventory space, wherein the response data include a plurality of response times, wherein each response time is associated with a corresponding individual RFID tag in the population of RFID tags, and wherein each response time indicates an elapsed time from the time at which an RFID reader begins a scan of the inventory space to the time at which the individual RFID tag provides a response;
    (b) based on the response data, calculating a plurality of individual maximum acceptable response times, wherein each individual maximum acceptable response time is associated with a corresponding individual RFID tag in the population of RFID tags;
    (c) scanning the entire population of RFID tags in the inventory space to prompt a response from each of the RFID tags in the population of RFID tags present in the inventory space; and
    (d) when a response is not received from a specific RFID tag in the population of RFID tags prior to elapse of the individual maximum acceptable response time for the specific RFID tag, designating the specific RFID tag as not present in the inventory space.

2. The method of claim 1 further comprising, when a response is received from the specific RFID tag prior to elapse of the individual maximum acceptable response time for the specific RFID tag, designating the specific RFID tag as present in the inventory space.

3. The method of claim 1 further comprising calculating response parameters based on response times associated with the population of RFID tags in the response data set, wherein the response parameters include a mean response time and a standard deviation from the mean response time.

4. The method of claim 3, wherein the individual maximum acceptable response time is equal to one of the mean response time plus six standard deviations, the mean response time plus nine standard deviations, the mean response time plus twelve standard deviations, or a maximum response time.

5. The method of claim 1 further comprising, when the response is received from the specific RFID tag prior to elapse of the individual maximum acceptable response time for the specific RFID tag:
    recording a response time for the specific RFID tag;
    updating the response data set to include the response time for the specific RFID tag; and
    recalculating the response parameters for each RFID tag based on the updated response data set.

6. An apparatus for monitoring a population of RFID tags in an inventory space, the apparatus comprising:
    one or more RFID antennae disposed within the inventory space and configured to receive RF signals emanated from the population of RFID tags located in the inventory space, wherein the RF signals include identification information;
one or more RFID readers associated with the inventory space and communicatively coupled to the one or more RFID antennae, wherein the one or more RFID readers are configured to decode the identification information contained with the RF signals emanated from the population of RFID tags in the inventory space; and
a controller communicatively coupled with the one or more RFID antennae and the one or more RFID readers, and configured to:
collect response data associated with the population of RFID tags present in the inventory space, wherein the response data include a plurality of response times, wherein each response time is associated with a corresponding individual RFID tag in the population of RFID tags, and wherein each response time indicates an elapsed time from the time at which the one or more RFID readers begin a scan of the inventory space to the time at which the individual RFID tag provides a response;
based on the response data, calculate a plurality of individual maximum acceptable response times, wherein each individual maximum acceptable response time is associated with a corresponding individual RFID tag in the population of RFID tags;
scan the entire population of RFID tags in the inventory space to prompt a response from each of the RFID tags in the population of RFID tags present in the inventory space; and
when a response is not received from a specific RFID tag in the population of RFID tags prior to elapse of the individual maximum acceptable response time for the specific RFID tag, designate the specific RFID tag as not present in the inventory space.

7. The apparatus of claim 6 wherein the controller is configured to designate the specific RFID tag as present in the inventory space when a response is received from the specific RFID tag prior to elapse of the individual maximum acceptable response time for the specific RFID tag.

8. The apparatus of claim 6 wherein the controller calculates response parameters based on response times associated with the population of RFID tags in the response data set, wherein the response parameters include a mean response time and a standard deviation from the mean response time.

9. The apparatus of claim 8 wherein the individual maximum acceptable response time is equal to one of the mean response time plus six standard deviations, the mean response time plus nine standard deviations, the mean response time plus twelve standard deviations, or a maximum response time.

10. The apparatus of claim 6 wherein, when the response is received from the specific RFID tag prior to elapse of the individual maximum acceptable response time for the specific RFID tag, the controller:
records a response time for the specific RFID tag;
updates the response data set to include the response time for the specific RFID tag; and
recalculates the response parameters for each RFID tag based on the updated response data set.

11. The apparatus of claim 6 further comprising an inventory database configured to store inventory information associated with the inventory space, wherein the inventory database is communicatively coupled with the controller.

* * * * *